United States Patent [19]

McShan

[11] E Re. 28,617

[45] Reissued Nov. 18, 1975

[54] STEREO MULTIPLEX DECODING SYSTEM WITH A PHASE LOCKED LOOP SWITCHING SIGNAL CONTROL

[76] Inventor: Clarence Hunter McShan, P.O. Box 392, Bluff Point, Northport, N.Y. 11768

[22] Filed: May 22, 1974

[21] Appl. No.: 472,347

Related U.S. Patent Documents

Reissue of:

[64] Patent No.: 3,584,154
Issued: June 8, 1971
Appl. No.: 737,511
Filed: June 17, 1968

[52] U.S. Cl. ..... 179/15 BT
[51] Int. Cl.[2] ..... H04H 5/00
[58] Field of Search ..... 179/15 BT; 331/25, 39, 331/36; 329/114, 122; 325/346, 416, 418, 419, 420; 307/225, 261, 296

[56] References Cited

UNITED STATES PATENTS

| | | | |
|---|---|---|---|
| 3,031,529 | 4/1962 | Colodny | 179/15 BT |
| 3,048,661 | 8/1962 | Schildknecht | 179/15 BT |
| 3,257,512 | 6/1966 | Eilers | 179/15 BT |
| 3,287,657 | 11/1966 | Widl | 331/25 |
| 3,328,719 | 6/1967 | DeLisle et al. | 331/25 |
| 3,336,534 | 8/1967 | Gluth | 331/25 |
| 3,339,026 | 8/1967 | Csicsatka | 179/15 BT |
| 3,375,451 | 3/1968 | Borelli et al. | 331/25 |
| 3,435,144 | 3/1969 | Csicsatka | 179/15 BT |

OTHER PUBLICATIONS

Neue Zurcher Zeitung Technik, Dec. 6, 1967, FIG. 13.

News From Rohde & Schwarz, Mar. 20, 1966, p. 11–13, FIG. 2.

*Primary Examiner*—Kathleen H. Claffy
*Assistant Examiner*—Thomas D'Amico
*Attorney, Agent, or Firm*—Brumbaugh, Graves, Donohue & Raymond

[57] ABSTRACT

A stereo decoding system for FM receivers that is compatible with integrated circuit techniques and contains a phase locked loop to provide stability for the demodulator switching signal. Carrier noise is maintained at a mimimum by a narrow equivalent band pass filter and in particular embodiments no indicators are required.

25 Claims, 4 Drawing Figures

INVENTOR.
C. Hunter McShan
BY
McGregor & Eisenman
ATTORNEYS

STEREO MULTIPLEX DECODING SYSTEM WITH A PHASE LOCKED LOOP SWITCHING SIGNAL CONTROL

Matter enclosed in heavy brackets [ ] appears in the original patent but forms no part of this reissue specification; matter printed in italics indicates the additions made by reissue.

If we adopt the convention that "R" represents the signal for driving a right side stereo unit and "L" represents the signal for driving a left-side stereo unit, it is possible to conveniently consider the spectrum of a conventional composite stereo signal. The entire signal embraces a range from 50 hertz to 53 kilohertz. The (R+L) channel ranges from 50 hertz to 15 kilohertz and is the channel received by an FM receiver. The (R−L) channel is carried on an amplitude modulated 38 kilohertz subcarrier which is suppressed leaving only the sidebands. The audio information is limited to 15 kilohertz. Thus, the (R−L) channel ranges from 23 kilohertz to 53 kilohertz. In the 8 kilohertz region between 15 and 23 kilohertz, a 19 kilohertz pilot subcarrier is transmitted. Obviously, no information is carried in this region and accordingly, no modulation interferes with the pilot subcarrier.

With present circuits, it has not been uncommon to use as many as eight inductors in the stereo multiplex circuitry and as many as eight adjustments are made during alignment of the receivers. In general, multiplex separation of the right and left channels of a stereo signal now requires the use of complex circuitry that is not, and cannot be, adapted to the compact and reliable circuit techniques rapidly becoming available in the electronic arts. The circuitry required to separate the 19 kilohertz pilot subcarrier requires at least one properly tuned resonant circuit. Such resonant circuits, even with quality factors of 50 (which makes them very expensive) utilize a bandpass zone that is much wider than necessary and thereby allow noise to pass through to the output. This noise, in turn, causes distortion by modulating the right and left channel. On the other hand, increasing the quality factor of the circuits further, not only increases the cost, but also imposes requirements for greater stability of the resonant circuit with respect to temperature and aging characteristics in order to avoid detuning. Unless excellent circuits are used, there are phase drifts of the output which result in incomplete separation of the right and left channels. It is common practice to compromise between noise reduction and tolerable noise level, completeness of separation, and cost.

Another factor to be considered in connection with receivers utilizing previously existing techniques, is the fact that skilled technicians using expensive equipment are needed to precisely tune the circuits to the pilot subcarrier frequency. Every time the services of a skilled technician are required, the cost of the unit increases and the problem of reliability arises.

In the usual processing of stereo signals, after the pilot subcarrier has been separated from the signal, it is necessary to double the frequency to develop the desired 38 kilohertz carrier. This is generally done with a harmonic generator or a locked-in oscillator. In either case, another resonant circuit tuned to the double frequency is employed. Obviously, this additional resonant circuit subjects the system to the aforementioned problems with the concomitant cost and reliability drawbacks.

The newly developed 38 kilohertz stereo subcarrier is employed to separate (R+L) and (R−L) channels which have been transmitted as interlaced samples at a 38 kilohertz rate. One standard way of interpreting and accomplishing the multiplex process involves using the subcarrier to operate circuits which switch alternate samples into a given channel. It is this switching technique that is used in combination with the new method of the present invention to obtain superior results with circuitry that is both reliable and conveniently assembled and maintained.

SUMMARY OF THE INVENTION

In accordance with the present invention there is provided an improved stereo separation system; more particularly, there is provided a stereo separation system utilizing a minimum of resonant circuits.

The invention provides for the switching of alternate samples of an input signal into given channels, and makes it possible to eliminate previously required filters and filtering circuits. This switching technique allows the separation process to be included in a new system of producing the 38 kilohertz stereo subcarrier which does not require resonant circuits.

In addition to providing a novel method for developing a 38 kilohertz subcarrier, a new method is disclosed for automatically switching to monaural operation when the stereo signal is not present. This new method is compatible with the new separation system taught hereinafter. According to the invention, when the presence of the pilot subcarrier is detected, the stereo separation circuits are activated and the bandwidth of the pilot subcarrier circuitry is reduced to eliminate introduction of extraneous noise into the information signals. The control signal that is produced upon detection of the pilot subcarrier may also be used to operate indicator means and to control automatic tuning of the receiver so that only stereo stations are tuned in.

As will appear hereinafter, even if one employs a 38 kilohertz oscillator without the automatic bandwidth control taught by this invention, only one inductor would be required in this arrangement as compared with as many as eight inductors in previous systems. If one incorporates the new automatic bandwidth control of the invention, an astable multivibrator that is not critical from the frequency standpoint, may be used. This eliminates the need for any inductors. Furthermore, it reduces alignment adjustments to one or two, at the most.

As a practical matter, the new system of the present invention can achieve 30 db. separation without introducing phase problems or adjustments. The absence of inductances renders the circuitry adaptable to integrated circuit construction and it is expected that with integrated circuit techniques, resistance ratios can be held to better than 3 percent and gains between channels can be held to 0.3 db. For example, the circuits for producing the sum and difference of the (R−L) and (R−L) signals should enable 30 db. separation without requiring a trimming adjustment.

It is an object of the present invention to provide an improved and simplified circuit construction for stereo separation systems which uses a minimum of inductors.

Another object of the invention is to provide an improved stereo separation system having automatic phase stability of the 38 kilohertz subcarrier in order to insure channel separation without the use of compensated components.

Another object of the invention is to provide an improved stereo separation system wherein subcarrier noise is reduced by the use of equivalent band-pass circuits which are narrower than those presently employed.

Still another object of the invention is to provide an improved stereo separation system which requires only one adjustment during alignment of the equipment.

Another object of the present invention is to provide an improved stereo separation system that is lighter and smaller than those previously available.

Another object of the present invention is to provide a stereo separation system that is more reliable than heretofore systems of equivalent complexity and quality.

Another object of the invention is to provide an improved automatic stereo-monaural control and indicator means that is compatible wiwth the system and adpatable to integrated circuitry techniques.

Another object of the invention is to provide an automatic subcarrier bandwidth control, which provides wide bandwidth for maximum pull-in range of the local oscillator and narrow bandwidth for minimum subcarrier noise after lock-in occurs.

It is another object of the present invention to provide a stereo separation system adaptable to use with integrated circuitry.

The above objects and features of the invention, as well as others, will be more clearly understood and appreciated from the following discussion made in conjunction with the drawings.

BRIEF DESCRIPTION OF THE DRAWINGS

As mentioned above, the composite stereo signal comprises an (R+L) channel from 50 hertz to 15 kilohertz, a pilot subcarrier at 19 kilohertz, and the (R−L) double sideband with suppressed carrier channel from 23 kilohertz to 53 kilohertz. FIG. 1 illustrates an embodiment of the invention wherein the composite signal is applied to a high pass filter 2, which removes the low frequencies that might pass through the following mixer and disturb the automatic frequency control or the automatic phase control of the carrier frequency oscillator 6. High pass filter 2 may advantageously be designed with a cutoff frequency at 4 kilohertz. After passage through high pass filter 2, the signal is applied to a mixer 3, the output of which passes through low pass filter 5 to the oscillator 6. Both the high pass filter 2 and the low pass filter 5 may be simple resistance capacitive-types which provide 6 db. attenuation per octave. Under typical operation, low pass filter 5 may be designed to pass frequencies of 1 hertz or less and prior to lock-in of the oscillator 6, an automatic bandwidth control feature of the invention would permit the widening of this bandwidth to several hundred hertz in order to permit pull-in of the oscillator. In view of the earlier use of high pass filter 2, better than 72 db. attenuation of the low frequencies occurs at the cutoff frequency of low pass filter 5.

Figure 1:
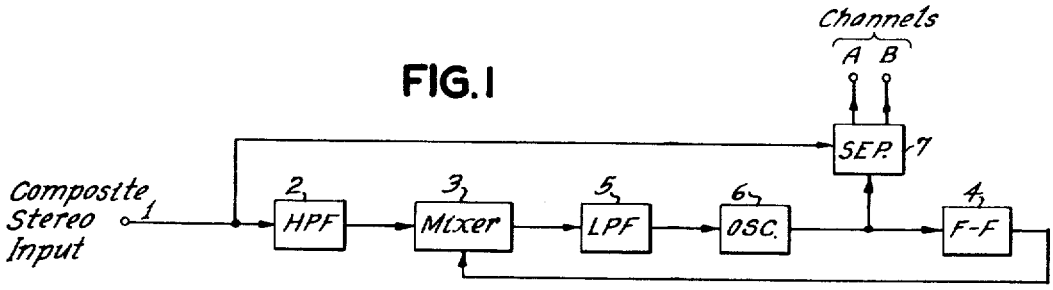
FIG. 1 is a block diagram of one embodiment of the invention illustrating the basic components required for generating a 38 kilohertz subcarrier signal.

Mixer 3 actually performs a switching function under the control of a flip-flop 4. As explained hereinafter, flip-flop 4 operates in synchronism with 38 kilohertz oscillator 6, at the 19 kilohertz pilot subcarrier rate. Thus, mixer 3 periodically connects the output of high pass filter 2 to the input of low pass filter 5. Flip-flop 4 provides a symmetrical output so that the signal from high pass filter 2 is sampled 50 percent of the time. This is illustrated by the crosshatched portion of waveform 12 in FIG. 3. The sampled portion of the 19 kilohertz pilot input is applied to low pass filter 5 which averages the positive and negative portions of the sample. When the phase of the flip-flop 4 output (and hence of oscillator 6 output) is correct, the average output of low pass filter 5 will be near zero. If the phase is not correct, the direct current output of low pass filter 5 will be of a discrete polarity and magnitude which can be used to correct the phase of the signal being produced by oscillator 6.

It should be recalled that the nearest signal to the pilot subcarrier is separated therefrom by ±4 kilohertz. The difference frequencies produced by mixer 3 will not be lower than 4 kilohertz and this is suppressed by low pass filter 5 by about 72 db. Thus, high pass filter 2 and low pass filter 5 in combination with mixer 3, produce the equivalent of a band-pass system having a bandwidth of 1 hertz determined by the low frequency cutoff of the low pass filter. This system suppresses unwanted signals at the low end by 72 db., as determined by the high pass filter; and at the high end by 75 db., as determined by the low pass filter. Furthermore, the high pass filter cutoff at 4 kilohertz is far below the 19 kilohertz which it passes, thus, the phase of the pilot is not displaced by more than 9° which enables 40 db. separation, and is not critical. Accordingly, the normally existing phase problem is avoided. The circuits for performing the described functions do not include tuned circuits and consequently no alignment adjustments must be made. Nevertheless, the proper phase relationship is assured.

Oscillator 6 generates the 38 kilohertz signal for replacing the suppressed stereo subcarrier and its output can be used for operation of a standard separation circuit 7. It is only necessary to divide the 38 kilohertz down to 19 kilohertz by the flip-flop 4 to provide the desired supply for the local input of mixer 3. A flip-flop is chosen for the division and control element because it can be made to switch state precisely with each positive differentiated trigger pulse from the square wave output of the oscillator. Flip-flop circuits are fast acting so that phase displacement is minimal and thus the phase relationships illustrated in FIG. 3 can be obtained. Furthermore, a flip-flop can be designed to provide the accurate division between on and off time which is required for sampling the mixer output before it is applied to low pass filter 5.

When the system shown in FIG. 1 is first energized, or when the pilot signal first occurs, oscillator 6 will run freely at a frequency different from 38 kilohertz. Thus, the output of flip-flop 4 will be different from 19 kilohertz. This will produce a small difference frequency in the output of mixer 3. The difference frequency will be passed by low pass filter 5 and is used to adjust the frequency of oscillator 6 until the divided frequency output of flip-flop 4 is the same as that of the pilot subcarrier. At this time, lock-in will occur.

Figure 2:
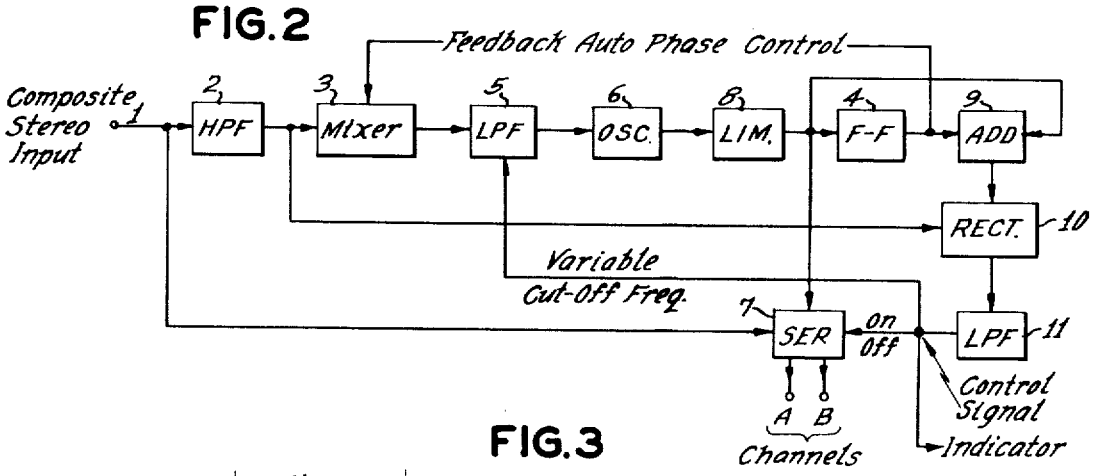
FIG. 2 is a block diagram of another embodiment of the invention, including automatic stereo-monaural control and automatic subcarrier bandwidth control.

In the event that the difference frequency produced at the output of mixer 3 during startup, is appreciably larger than the low pass frequency cutoff, then the low pass frequency cutoff has to be raised until lock-in occurs. A relatively simple way of handing this is illustrated in FIG. 2. In addition the components shown and discussed in connection with FIG. 1, FIG. 2 includes limiter 8, adder 9, rectifier 10, and low pass filter 11. Limiter 8 is simply employed to improve the shape of the output from oscillator 6. It may be used in accordance with the specific requirements of individual circuits, or it may be omitted. Adder 9, rectifier 10, and low pass filter 11 are used to develop a suitable control signal for lowering the low frequency cutoff of low pass filter 5.

Figure 3:
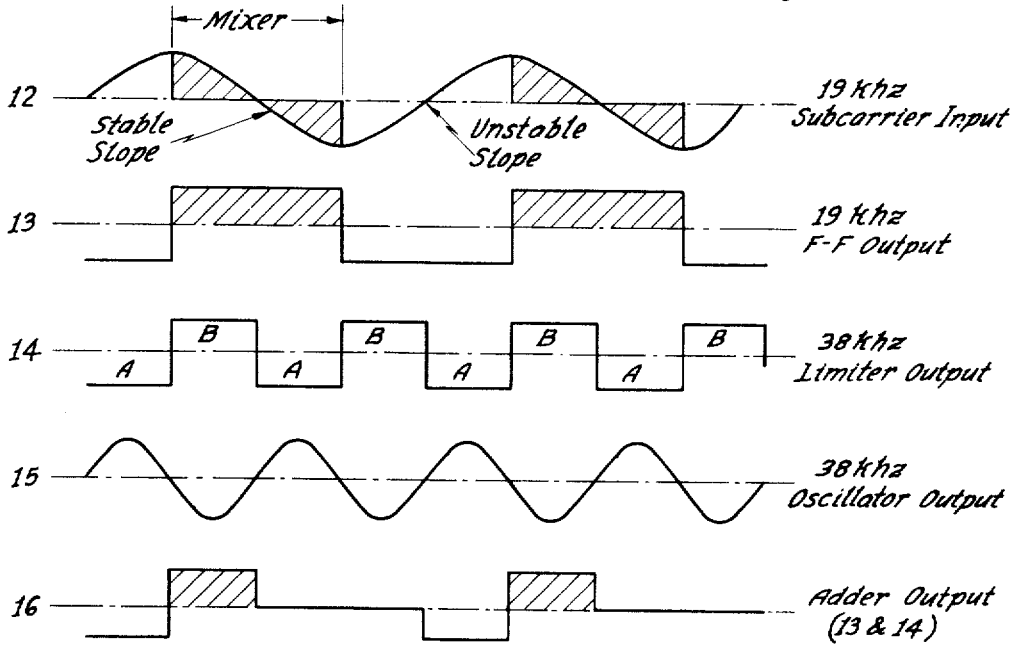
FIG. 3 is a plurality of waveforms illustrating various signals present during the functioning of the system of the invention.

If a sinusoidal oscillator is used in the arrangement of FIG. 2, the output would correspond to waveform 15 in FIG. 3. In this case, limiter 8 will produce a square wave output corresponding to waveform 14. The outputs of limiter 8 and flip-flop 4 (waveforms 13 and 14) are both applied to adder 9 to produce the waveform 16 shown in FIG. 3. This combined output signal gates rectifier 10 for the intervals indicated by the cross-hatching. In other words, rectifier 10 is oriented to pass the positive portion of the 19 kilohertz waveform 16 to low pass filter 11 which produces a direct current signal. This direct current signal is a control signal that does not appear until lock-in of oscillator 6 occurs, because prior to that occurrence only the difference frequency is present and will not be passed by low pass filter 11. This control signal may be used to activate an automatic stereo-monaural on-off condition in the separation circuit 7, and it may also be used to operate an indicator light if desired.

A convenient way to use the control signal for lowering the cutoff of low pass filter 5 is to use a simple RC low pass filter with the resistive portion in separate elements. One of the elements may be shunted by a solid state device that is either conductive or nonconductive under the control of the control signal.

According to one modification of the circuitry illustrated in FIG. 1, oscillator 6 may be designed to operate on a frequency of 76 kilohertz. In this case, an additional flip-flop may be added at the output of oscillator 6 in order to reduce the frequency to 38 kilohertz so that it may operate as previously described. A similar modification may be made in FIG. 2. In the latter case, however, limiter 8 may be replaced by the additional flip-flop which would be designed to reduce the 76 kilohertz output from oscillator 6 to a 38 kilohertz signal.

Figure 4:
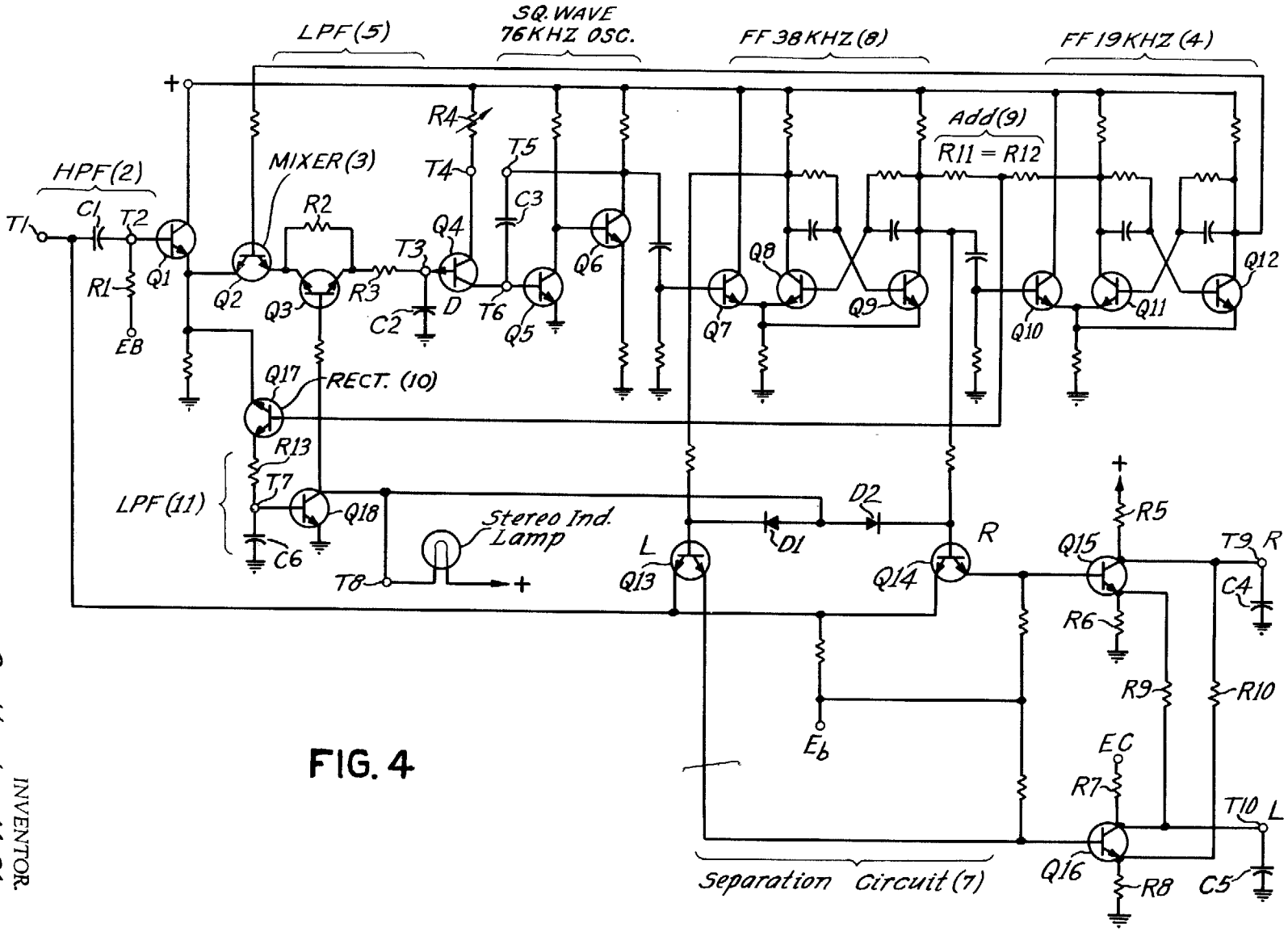
FIG. 4 is a circuit schematic showing typical components for use in developing circuitry according to the embodiments disclosed herein.

FIG. 4 is a circuit diagram illustrating typical components that may be employed in order to develop the circuitry referred to in connection with FIGS. 1 and 2. In particular, the circuit illustrates the modification of FIG. 2 referred to in the preceding paragraph. This circuit discloses the simplicity of the system when reduced to practice, and illustrates to those skilled in the art how easily adapted the system is to integrated circuitry techniques. The circuitry is not critical and experience has shown it to be practical to build and operate. Inasmuch as the elements are conventional and well appreciated in the art, a detailed circuit description is not believed necessary. The various components have been functionally labeled in order to render them compatible with the blocks shown in FIG. 2.

It will be noticed that in order to render the circuitry most adaptable to integrated circuit design, direct coupling is employed as frequently as possible and requirements for level shifting, biasing, and stabilizing of the system are important. It is up to the circuit designer to select the particular technique desired in order to fulfill the basic block functions already described. The circuit shown in FIG. 4 is obviously for illustrative purposes.

The composite stereo input signal is applied to the base of a transistor Q1 via filter elements C1 and R1. These elements perform the function of high pass filter 2 and the output at the emitter of transistor Q1 is applied to the emitter of mixer transistor Q2 and to the emitter of transistor Q17 which corresponds generally to rectifier 10 in FIG. 2. The mixer comprising transistor Q2 is actually an on-off switch which operates on a 50/50 time basis and thus, it may be regarded as a sampling device. The output thereof enters low pass filter 5 which (as was the case of the high pass filter 2) is basically a resistive-capacity type filter having components R2, R3, and C2. The two portions of the resistive component are both in the circuit during normal stereo operation providing a low cutoff frequency condition. Prior to lock-in of oscillator 6, however, the bandwidth control signal is absent this causes the transistor Q3 to switch to an on condition, thereby shunting resistance R2 and raising the filter cutoff frequency. During normal stereo operation, the direct current output from low pass filter 5 is applied to the emitter electrode of an FET transistor Q4. Transistor Q4 and C3 control the frequency of oscillator 6 in accordance with the setting of adjustable resistor R4. In this embodiment, oscillator 6 comprises transistors Q5 and Q6 and produces a pulsed output with a repetition rate of 76 kilohertz. The pulsed output is differentiated and applied via transistor Q7 to an astable multivibrator comprising transistors Q8 and Q9 which act to divide the repetition rate by two and produce a square wave output at 38 kilohertz.

The output of flip-flop 8 is applied directly to one side of the adder 9 made up of resistors R11 and R12. It is also differentiated and applied via transistor Q10 to drive ann astable multivibrator comprising transistor Q11 and Q12. The latter circuit constitutes flip-flop 4 and produces the 19 kilohertz signal for use with mixer 3 in detecting the pilot subcarrier. Thus, an output of flip-flop 4 is connected to the base of mixer transistor Q2 and another output is applied to resistor R12 of adder 9.

Obviously, the phase relationship between the 38 kilohertz signal and 19 kilohertz signal is precisely as shown in FIG. 3 and cannot be altered, as would be the case of tuned circuits. Furthermore, the flip-flop output is precisely a 50/50 square wave. This is important because it determines the length of time of the sampling period of the mixer 3 shown in the wavefrom 12 of FIG. 3. The positive and negative portions of the sample must be equal in order to make the average zero and control the oscillator phase. This occurs when the flip-flop output is 90° displaced with respect to the 19 kilohertz pilot subcarrier input to mixer 3. The 90° phase shift is a direct result of the manner of generating the 38 kilohertz and permits the system to produce all of the desired phase relationships illustrated in the typical waveforms of FIG. 3. It should be noted that waveform 12 of FIG. 3 has both stable and unstable slopes, the unstable condition occurring because the control signal from FET transistor Q4 due to a phase error, will be in the wrong polarity to correct the error and will tend to increase the phase error until 180° is reached, at which point the slope is reversed and the error will be reduced until stable lock-in occurs. This means that the right and left channels can always be identified. They do not switch positions each time lock-in occurs.

Adder 9 facilitates the detection of the presence of the 19 kilohertz pilot subcarrier. The outputs of flip-flop 8 and flip-flop 4 are combined in adder 9 to produce the signal waveform shown at 16 in FIG. 3. The adder is an extremely simple arrangement and the signal to noise ratio is good because of the narrow equivalent pass-band. The output signal from the adder is applied to transistor Q17 which is thereby rendered conductive. Transistor Q17 acts as a switch and connects the 19 kilohertz pilot subcarrier from the emitter of transistor Q1 to a low pass filter comprising resistor R18 and capacitor C6. Only the direct current passes the low pass filter, and this triggers transistor Q18 into conduction. It will be appreciated that the above-described sequence of events, terminating in conduction of transistor Q18, only occurs after oscillator 6 is locked in. Prior to that time, only a small difference frequency exists which cannot pass the low pass filter 11. The conduction of transistor Q18 is a positive indication that a stereo signal is being received and can be used to operate the stereo separation switches and also, if desired, an indicator means.

The system is designed so that lock-in of oscillator 6 occurs faster than the enablement of transistor Q18. The output of transistor Q18 is employed to open the gate comprising transistor Q3 which lowers the cutoff of low pass filter 5. Should lock-in of oscillator 6 be lost while the pilot subcarrier is present, the cutoff level of low pass filter 5 will be raised and accordingly, the initial lock-in procedure will be repeated. In other words, this system is adapted to cope with all situations.

The collector outputs of flip-flop 8 are used in conjunction with a control signal derived from the collector of transistor Q18 to operate the stereo separation circuit 7. Separation circuit 7 comprises bidirectional transistor switches Q13 and Q14 for the left and right channels respectively. When a stereo signal is present, transistor Q18 is conducting and its collector is substantially at ground potential. Under this condition, diodes D1 and D2 are reverse-biased and do not affect the operation of the stereo separation circuit. Thus, as flip-flop 8 switches states, transistor Q13 and Q14 are alternately rendered conductive. The input signal is connected to each transistor and it is accordingly switched from one channel to the other. The left channel includes a buffer amplifier Q16 which receives the input signal when transistor Q13 is conducting. The right channel includes a buffer amplifier Q15 which receives the input signal when transistor Q14 is conducting. These buffer amplifiers isolate the outputs at L and R from any input impedance variations due to the described switching action. Collector load resistors R5 and R7 in combination with capacitors C4 and C5 function as a deemphasis network which acts as a low pass filter to remove switching ripple to the extent of −26 db. It will be appreciated that the use of bidirectional type transistors Q13 and Q14 as channel switches eliminates the need for a 38 kilohertz rejection filter in each channel.

The right channel contains a small percentage of left signal and the left channel contains a small percentage of the right signal. Resistors R9 and R10 are used to cross couple the channels and cancel out these undesired percentages. By providing a proper ratio of R5 to R10, a proper portion of the left channel signal at the emitter of transistor Q16 will be coupled into the right channel to null out the left component that originally entered transistor Q15. Similarly, the left channel has its small amount of right signal nulled out by the ratio of R7 to R9. It has been found that the emitter resistors, R6 and R8 should preferably be equal within 3 percent to tolerance. The magnitudes of these resistors is not that critical. This is also true of the collector resistors R5 and R7. The ratios R5/R10 and R7/R9 should preferably also be held to 3 percent to enable 40 db. separation between the right and left channels. Since the phase variations between channels are absent, the ratios may be fixed, and separation will be uniform across the audio spectrum. This is true provided the radio frequency and intermediate frequency receiver band-pass is sufficiently wide and flat not to distort the signal.

When a monaural signal is being received, transistor Q18 is in a nonconducting state. As a result, diodes D1 and D2 both conduct and this dominates the signals from flip-flop 8. Under these conditions, transistors Q13 and Q14 both conduct and the input signal is connected to both output channels. Even if a stereo input signal is present, one can cause the system to operate in a monaural mode by grounding the base of transistor Q18. As illustrated, a stereo indicator lamp may be connected to the collector of transistor Q18 to provide a discrete indication when a stereo signal is being received.

Many frequency modulation stations transmit an SCA channel with a frequency modulated carrier at 67 kilohertz. Usually, an SCA filter is used to remove this signal; however, with the present system it is possible to avoid such a filter. By using a 76 kilohertz multivibrator oscillator and dividing by two with a flip-flop, a perfect square wave 38 kilohertz stereo subcarrier is obtained to operate the left and right switching circuits. The deemphasis filter normally following the switching means should be isolated from input impedance variations caused by the switching action. This may be done, as previously discussed, by a buffer amplifier whose output presents a constant impedance to the input of the deemphasis filter. Also, as previously described, the stereo switch may be a bidirectional transistor operating into a resistive load and the input of the buffer stage. In this way, the pulse samples are applied precisely 50 percent of the period of 38 kilohertz. This method completely rejects a 9 kilohertz intermodulation product caused by the second harmonic of 38 kilohertz and the 67 kilohertz SCA carrier, thereby avoiding the tendency "sample and hold," a type of operation that produces intermodulation products. This type operation may also be applied to mixer 3 in combination with the low pass filter 5, to insure maximum characteristics of the automatic phase control signal controlling the oscillator frequency. Also, the same may apply to rectifier 10 and low pass filter 11.

Another object in using a bidirectional transistor switch is to isolate the 38 kilohertz signal from the channel outputs and eliminate the need for two 38 kilohertz rejection filters. The deemphasis filters function to suppress a 38 kilohertz ripple due to sampling about −26 db. below the instantaneous signal level. It is clear that the discriminator output filter need only be a resistor-capacitor type intermediate frequency filter and, therefore, this system is capable of eliminating all inductors in the audio system of a stereo receiver. The suggested system also avoids phase differences between the (L+R) and (L−R) channels caused by the sharp cutoff filters necessary in present systems, which are incompatible with good separation requirements.

A number of embodiments of the invention have been shown and described. Where possible, comments have also been made suggesting practical modifications that might be desirable in some circuit designs. It is intended to include within the scope of the following claims, all modifications of the invention which come within the spirit and teachings of the material hereinbefore presented.

What I claim is:

1. In a system, *particularly adaptable for integrated circuitry* for decoding a composite stereophonic signal having signal components in a band of lower frequencies, signal components in a separate band of higher frequencies and a pilot subcarrier signal at a frequency intermediate said bands, the combination of first filter means effective to pass said pilot subcarrier signal and at least attenuate frequencies below said pilot subcarrier signal, control signal responsive *electrical* means for generating a first local signal with a frequency that is a multiple of the frequency of said pilot subcarrier signal, frequency divider means responsive to said local signal generating means for generating at least one other local signal in phase locked relation to said first local signal and of the same frequency as said pilot subcarrier signal, signal sampling means connected to receive said pilot subcarrier signal from said filter means and rendered operative periodically by said other local signal for supplying to said first local signal generating means a control signal representative of periodically selected samples of said pilot subcarrier signal so as to maintain said first and other signals in phase locked relation to said pilot subcarrier signal, second filter means [interposed between] *coupled to* said sampling means [and] *with a constant driving impedance and connected to* said control signal responsive generating means for passing to the latter only signals of frequency less than or equal to the difference between the frequency of said pilot subcarrier signal and the frequency of said other local signal, [and] *said control signal responsive means, frequency divider means, signal sampling means and second filter means forming a phase lock loop that will accept unattenuated modulation components of the composite signal and respond only to the pilot subcarrier to produce a control signal* means jointly responsive to said composite signal and to a multiple of said other local signal for separating said composite signal into different information containing components, *and de-emphasis means in each output of the decoder for restoring the signal characteristics in original form.*

2. A stereophonic decoding system according to claim 1, wherein said first local signal generating means comprises an oscillator and the frequency divider means is synchronized and in phase locked relation with the output of said oscillator.

3. A stereophonic signal decoding system as in claim 2, in which said signal sampling means functions as a switch with equal ON and OFF periods in response to the output of said divider means at a 19 kilohertz switching rate and in 90° out-of-phase relation to said pilot carrier, [and with said signal sampling means being coupled by a constant driving impedance means to said second filter means,] all to reject effectively undesired intermodulation products in the output of said second filter means.

4. A stereophonic signal decoding system as in claim 3, in which said signal sampling means comprises bidirectional solid state switching means in which the output of said divider means is substantially isolated from the input and output of said signal sampling means.

5. A stereophonic signal decoding system according to claim 4, wherein said frequency divider means is bistable circuit means that changes state responsive to the output of said oscillator, whereby said signal sampling means is effective to extract samples of said pilot subcarrier signal passing through said first filter menas.

6. A stereophonic signal decoding system according to claim 5, including limiting means at the output of said oscillator.

7. A stereophonic signal decoding system according to claim 1, wherein said first local signal generating means comprises an oscillator providing an output signal having a nominal frequency that is an [integral] *integer* multiple of the frequency of said pilot subcarrier, and *wherein said stereophonic signal decoding system further includes* a plurality of frequency divider means responsive to the output of said oscillator [are provided] for reducing said nominal frequency to said pilot subcarrier frequency *and said pilot subcarrier signal, and control means responsive to the outputs of said frequency divider means and said pilot subcarrier signal for producing a second control signal, and said stereo separating means includes means controlled by said control means to separate the components of said composite signal only when said pilot subcarrier is present.*

8. A stereophonic signal decoding system according to claim 7, [including] *wherein said* control means responsive to the outputs of said frequency divider means [to] selectively [modify] *modifies* the cutoff frequency of said second filter means when the output of said divider means is synchronized with said pilot subcarrier signal.

9. A stereophonic signal decoding system according to claim 8, wherein said control means includes means for adding the outputs of said frequency divider means, unidirectionally conductive means supplied by the output of said first filter means and controlled by the output of said adding means to selectively pass the output of said first filter means, and third low pass frequency filtering means responsive to the output of said unidirectionally conductive means to provide the control signal for modifying said cutoff frequency.

10. A stereophonic signal decoding system according to claim [9] *7*, wherein the output of one of said frequency divider means and said composite stereophonic signal is supplied to said composite signal separating means, [and wherein said stereo separating means includes means controlled by said control means to separate the components of said composite signal only when said pilot subcarrier is present].

11. A stereophonic signal decoding system according to claim [10] *7* wherein said composite signal separating means comprises a plurality of bidirectional solid state switching means connected to receive said composite signal, said switching means including means substantially isolating said second control signal from the input and output of said switching means, and said switching means being rendered successively conductive and nonconductive for equal time periods under control of one of said frequency dividing means to pass samples of said composite signal alternately to separate signal component channels.

12. A stereophonic signal decoding system according to claim 11, wherein each of said bidirectional switching means has buffer means at the output thereof.

13. A stereophonic signal decoding system according to claim 12, wherein the outputs of said buffer means are cross-coupled to cancel unwanted signal components.

14. A stereophonic signal decoding system according to claim 13, wherein the output of each filter means includes deemphasis filter means to remove switching ripple introduced by the operation of said bidirectional switching means, said buffer means presenting constant driving impedance to said deemphasis filter means.

15. A stereophonic signal decoding system according to claim 14, in which each buffer means comprises transistor amplifier means coupled to each output of said switching means and having collector and emitter outputs 180° phase related, deemphasis low pass filter means is coupled to each collector, and a portion of the emitter output of each amplifier means is cross-coupled to the collector of the other amplifier means to secure maximum signal separation.

16. A stereophonic signal decoding system according to claim 15, in which the means for automatically reducing the cutoff frequency of said second filter means when synchronization occurs comprises controllable rectifier means coupled to the output of said first filter means, said rectifier means being controlled by a 19 kilohertz signal derived from said divider means whereby said rectifier means produces a DC signal output when said pilot subcarrier signal is present and when synchronization occurs, and means responsive only to said DC signal output for reducing the cutoff frequency of said second filter means.

17. A stereophonic signal decoding system as in claim 16, together with means for rendering said switching means conductive when said first filter means receives a monaural signal input.

18. A stereophonic decoding apparatus according to claim 16, wherein said DC signal transfers the separation means from monaural operation to stereo operation.

19. A stereophonic decoding system according to claim 16, wherein said DC signal is also used to actuate stereophonic indicator means.

20. A stereophonic decoding apparatus according to claim 16, wherein the cutoff frequency of said second filter means is altered by altering an electrical component in said second filter means in reponse to said control signal.

*21. In a system for decoding a composite stereophonic signal having signal components in a band of lower frequencies, signal components in a separate band of higher frequencies and a pilot subcarrier signal at a frequency intermediate said bands, the combination of*

*first filter means effective to pass said pilot subcarrier signal and at least attenuate frequencies below said pilot subcarrier signal,*

*control signal responsive means for generating a first local signal with a frequency that is a multiple of the frequency of said pilot subcarrier signal,*

*said first local signal generating means comprising an oscillator,*

*frequency divider means responsive to said local signal generating means for generating at least one other local signal in phase locked relation to said first local signal and of the same frequency as said pilot subcarrier signal, said frequency divider means being synchronized and in phase locked relation with the output of said oscillator,*

*signal sampling means connected to receive said pilot subcarrier signal from said filter means and rendered operative periodically by said other local signal for supplying to said first local signal generating means a control signal representative of periodically selected samples of said pilot subcarrier signal so as to maintain said first and other signals in phase locked relation to said pilot subcarrier signal, said signal sampling means functioning as a switch with equal ON and OFF periods in reponse to the output of said divider means at a 19 kilohertz switching rate and in 90° out-of-phase relation to said pilot subcarrier,*

*second filter means interposed between said signal sampling means and said control signal responsive generating means for passing to the latter only signals of frequency less than or equal to the difference between the frequency of said pilot subcarrier signal and the frequency of said other local signal, said signal sampling means being coupled by a constant driving impedance means to said second filter means, all to reject effectively undesired intermodulation products in the output of said second filter means, and*

*means jointly responsive to said composite signal and to a multiple of said other local signal for separating said composite signal into different information containing components.*

*22. A stereophonic decoding system according to claim 21, wherein said first filter means is a high pass filter having characteristics for attenuating undesirable components below said composite signal and is effective to pass at least said pilot subcarrier signal and said signal components in said band of higher frequencies.*

*23. In a system particularly adaptable for integrated circuitry for decoding a composite stereophonic signal having signal components in a band of lower frequencies, signal components in a separate band of higher frequencies, and a pilot subcarrier signal at a frequency intermediate said bands, the combination of*

*first filter means having high pass characteristics for attenuating undesirable components below said composite signal and effective to pass at least said pilot subcarrier signal and said signal components in said band of higher frequencies.*

*control signal responsive means for generating a first local signal with a frequency that is a multiple of the frequency of said pilot subcarrier signal,*

*frequency divider means responsive to said local signal generating means for generating at least one other local signal in phase locked relation to said first local signal and of the same frequency as said pilot subcarrier signal,*

*signal sampling means connected to receive said pilot subcarrier signal from said filter means and rendered operative periodically by said other local signal for supplying to said first local signal generating means a control signal representative of periodically selected samples of said pilot subcarrier signal so as to maintain said first and other local signals in phase*

*locked relation to said pilot subcarrier signal,*

*second filter means coupled between said sampling means and said control signal responsive generating means for passing the latter only signals of frequency less than or equal to the difference between the frequency of said pilot subcarrier signal and the frequency of said other local signal,*

*said signal sampling means and the coupling thereof to said second filter means incorporating means for avoiding the generation of objectionable intermodulation products, and*

*means jointly responsive to said composite signal and to a multiple of said other local signal for separating said composite signal into different information containing components.*

*24. A stereophonic decoding system according to claim 23, wherein:*

*said first local signal generating means comprises an oscillator,*

*said frequency divider means is synchronized and in phase locked relation with the output of said oscillator,*

*said signal sampling means functions as a switch with equal ON and OFF periods in response to the output of said divider means at a 19 kilohertz switching rate and in 90° out-of-phase relation to said pilot subcarrier, and*

*said means for avoiding the generation of objectionable intermodulation products includes a constant driving impedance coupling between said signal sampling means and said second filter means, all to reject effectively undesired intermodulation products in the output of said second filter means.*

*25. A stereophonic decoding system according to claim 23, wherein:*

*said first local signal generating means comprises an oscillator providing an output signal having a nominal frequency that is an integral multiple of the frequency of said pilot subcarrier,*

*said frequency divider means comprises a plurality of frequency dividers responsive to the output of said oscillator for reducing said nominal frequency to said pilot subcarrier frequency,*

*and further comprising control means responsive to the outputs of said frequency divider means and said pilot subcarrier signal for producing a second control signal, and*

*said stereo separating means includes means controlled by said control means to separate the components of said composite signal only when said pilot subcarrier is present.*

* * * * *

UNITED STATES PATENT AND TRADEMARK OFFICE

CERTIFICATE OF CORRECTION

PATENT NO. : Re. 28,617

DATED : November 18, 1975

INVENTOR(S) : C. Hunter McShan

It is certified that error appears in the above-identified patent and that said Letters Patent are hereby corrected as shown below:

In the Abstract, line 5, "mimimum" should be -- minimum --; In the Abstract, line 6, "indicators" should be -- inductors --. Col. 1, line 10, insert -- BACKGROUND OF THE INVENTION --. Col. 2, line 61, "(R-L)" should be -- (R+L) --. Col. 3, line 21 "wiwth" should be --with --; Col. 3, lines 21 and 22, "adpatable" should be -- adaptable --. Col. 5, line 10, after "addition" insert -- to --. Col. 6, line 45, "ann" should read -- an --; Col. 6, line 58, "wavefrom" should read -- waveform -- Col. 7, line 9, delete "the" (first occurrence). Col. 9, line 27, delete "electrical"; Col. 9, line 41, after "other" insert -- local --. Col. 10, line 4, "carrier" should read -- subcarrier --; Col. 10, lines 32 and 33 delete "and said pilot subcarrier signal". Col. 10, line 60, move the bracket to the left to include the comma. Col. 11, lines 27 and 28, delete "cross-coupled".

Signed and Sealed this

Eighth Day of February 1977

[SEAL]

*Attest:*

RUTH C. MASON
*Attesting Officer*

C. MARSHALL DANN
*Commissioner of Patents and Trademarks*